(12) United States Patent
Keohane et al.

(10) Patent No.: US 8,725,874 B2
(45) Date of Patent: May 13, 2014

(54) DYNAMIC DETERMINATION OF AN IDEAL CLIENT-SERVER FOR A COLLABORATIVE APPLICATION NETWORK

(75) Inventors: Susann M. Keohane, Austin, TX (US); Gerald F. McBrearty, Austin, TX (US); Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1148 days.

(21) Appl. No.: 11/862,432

(22) Filed: Sep. 27, 2007

(65) Prior Publication Data

US 2009/0089363 A1 Apr. 2, 2009

(51) Int. Cl.
*G06F 15/173* (2006.01)

(52) U.S. Cl.
USPC ............................. 709/226; 709/224; 709/229

(58) Field of Classification Search
USPC .................. 709/203, 223, 224, 226, 227, 229
See application file for complete search history.

(56) References Cited

U.S. PATENT DOCUMENTS

| | | | |
|---|---|---|---|
| 6,119,162 A | 9/2000 | Li et al. | |
| 6,363,416 B1 | 3/2002 | Naeimi et al. | |
| 6,601,101 B1 * | 7/2003 | Lee et al. | 709/227 |
| 6,957,254 B1 | 10/2005 | Iterum et al. | |
| 2002/0099521 A1 * | 7/2002 | Yang et al. | 702/186 |
| 2002/0156784 A1 * | 10/2002 | Hanes et al. | 707/9 |
| 2002/0161680 A1 * | 10/2002 | Tarnoff | 705/35 |
| 2005/0027904 A1 | 2/2005 | Khawand et al. | |
| 2005/0055418 A1 | 3/2005 | Blanc et al. | |
| 2005/0132166 A1 * | 6/2005 | Saffre | 712/26 |
| 2005/0249219 A1 * | 11/2005 | Bajko et al. | 370/395.3 |
| 2006/0031510 A1 * | 2/2006 | Beck et al. | 709/226 |
| 2009/0089363 A1 * | 4/2009 | Keohane et al. | 709/203 |

OTHER PUBLICATIONS

Varshavsky et al. "A Cross-Layer Approach to Service Discovery and Selection in Manets", 2005 IEEE Int. Conf. on Mobile Adhoc and Sensor Systems, Nov. 7-10, 2005.

* cited by examiner

*Primary Examiner* — Viet Vu
*Assistant Examiner* — Keyvan Emdadi
(74) *Attorney, Agent, or Firm* — Yudell Isidore Ng Russell PLLC

(57) ABSTRACT

The ideal client-server for a collaborative application in a client-server network environment is dynamically determined. An Ideal Server utility compares the capabilities of the computer system of an entering client with the computer system of the current client-server to determine which system is best equipped to control the execution of the application. Whenever a new client enters/participates in the application session, the Ideal Server utility evaluates the system capabilities of the new client (the candidate client-server) and compares the new client's system capabilities with the system capabilities of the current client-server. If the new client possesses better capabilities than the current client-server, the new client is provided the role of the client-server. A transfer of the application to the candidate client-server is initiated. Once the transfer is completed, the application resumes processing on the new client-server.

20 Claims, 5 Drawing Sheets

| Client 1 - Server | CPU speed: 1.2 GHz | Network connection: Ethernet 2 | Affiliation: 1 | |
|---|---|---|---|---|
| Memory: 512 MB | | 512kbps | | |
| Storage: 80 GB | | | | |

Score 7

302

| Client 3 | CPU speed: 1.4 GHz | Network connection: Ethernet 1 | Affiliation: 1 | |
|---|---|---|---|---|
| Memory: 1GB | | T1 | | |
| Storage: 80 GB | | | | |

Score 8.5

US 8,725,874 B2

DYNAMIC DETERMINATION OF AN IDEAL CLIENT-SERVER FOR A COLLABORATIVE APPLICATION NETWORK

BACKGROUND OF THE INVENTION

1. Technical Field

The present invention generally relates to computer network systems and in particular to client-server computer networks. Still more particularly, the present invention relates to client-server determination in client-server computer networks.

2. Description of the Related Art

Most multi-client collaborative applications are provided via a standard topology in which a dedicated server (computer system) is provided to support core server-level functions of the executing application(s). In this topology, each of the clients accessing the application(s) connects to the dedicated server and interacts directly with the dedicated server. IBM Lotus Notes® is a well known example of such an application.

With some more conventional collaborative applications, however, the applications relies on a client-server topology by which one of the "client" computer systems assumes the role of and operates as the "server" for other clients. One example of such applications is online gaming. There are many online games in which the gaming application is written such that the computer system of the person who initiates a "gameroom", for example, takes the role of the server of the gaming application. Further, many online game servers are really used to direct a number of players/clients to a client-server which, in reality, is a home PC of a user/player spawning/running the game's server-type functions.

These interactive software applications typically require the client-server provide certain processing and network connection capabilities, which may place a heavy burden on the client-server. Utilizing a client-server which does not provide the required capabilities results in the application executing below an ideal operating level and negatively affecting the experience of the other clients.

Each client participating in the interactive environment may have different system capabilities. Thus, it is not uncommon for the client-server to have inferior system capabilities compared to one or more of the other clients participating in the interactive application. However, since the client-server is the initiator of the server-level functions of the application, the client-server retains control of the execution of the application during an ongoing session.

SUMMARY OF THE INVENTION

Disclosed is a method, system and computer program product for dynamically determining, in real time, the ideal client-server for a collaborative application in a client-server network environment. In particular, an Ideal Server utility compares the capabilities of the computer system of an entering client with the computer system of the current client-server to determine which system is best equipped to control the execution of the application. The Ideal Server utility first evaluates the system capabilities of the initiator/client-server of the application and stores the evaluation results. Whenever a new client enters/participates in the application session, the Ideal Server utility evaluates the system capabilities of the new client (the candidate client-server) and compares the new client's system capabilities with the system capabilities of the current client-server. If the new client possesses better capabilities than the current client-server, the new client is provided the role of the client-server. A transfer of the application to the candidate client-server is initiated with the transfer of client-server parameters and ongoing application data. Once the transfer is completed, the application then resumes processing on the candidate client-server, which is now the new client-server. The transfer completes with negligible downtime of the ongoing application session.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 illustrates example tables containing system value parameters of two client systems utilized for determining relative system value, according to an illustrative embodiment of the present invention;

DETAILED DESCRIPTION OF AN ILLUSTRATIVE EMBODIMENT

Figure 1:
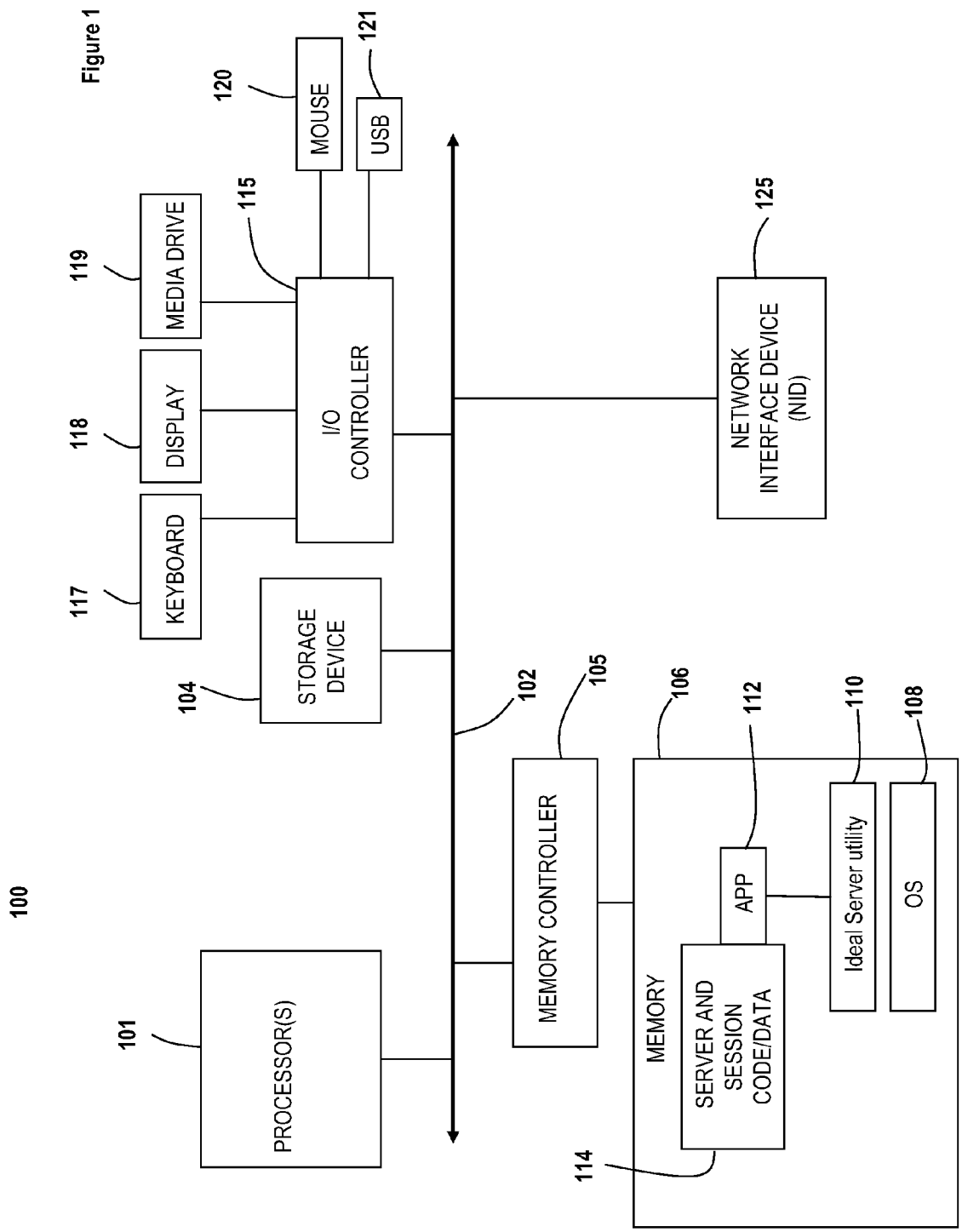
FIG. 1 illustrates a data processing system within which features of the invention may be advantageously implemented.

The present invention provides a method, system and computer program product for dynamically determining, in real time, the ideal client-server for a collaborative application in a client-server network environment. In particular, an Ideal Server utility compares the capabilities of the computer system of an entering client with the computer system of the current client-server to determine which system is best equipped to control the execution of the application. The Ideal Server utility first evaluates the system capabilities of the initiator/client-server of the application and stores the evaluation results. Whenever a new client enters/participates in the application session, the Ideal Server utility evaluates the system capabilities of the new client (the candidate client-server) and compares the new client's system capabilities with the system capabilities of the current client-server. If the new client possesses better capabilities than the current client-server, the new client is provided the role of the client-server. A transfer of the application to the candidate client-server is initiated with the transfer of client-server parameters and ongoing application data (session data). Once the transfer is completed, the application then resumes processing on the candidate client-server, which is now the new client-server. The transfer completes with negligible downtime of the ongoing application session.

In the following detailed description of embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e. g, 1xx for FIGS. 1 and 2xx for FIG. 2). The specific numerals assigned to the elements are provided solely to aid in the description and not meant to imply any limitations (structural or functional) on the invention.

It is also understood that the use of specific parameter names are for example only and not meant to imply any limitations on the invention. The embodiments of the invention may thus be provided with different nomenclature/terminology utilized to describe the above parameters, without limitation.

With reference now to the figures, FIG. 1 illustrates a block diagram of data processing system within which features of the invention may be advantageously implemented. Data processing system (DPS) 100 may be utilized as a client-server (which executes collaborative/shared application software, for example) or a new client, capable of becoming the client-server. However, within the description herein, DPS 100 is assumed to be the current client-server.

DPS 100 comprises processor 101 connected to system bus/interconnect 102. Controlling access to memory 106 is memory controller 105 which is also connected to system bus/interconnect 102. Also coupled to system bus 102 is other storage 104 and input/output controller (I/O Controller) 115, which controls access by several input devices, of which mouse 120 and keyboard 117 are illustrated. I/O Controller 115 also controls access to output devices, of which display 118 is illustrated. In order to support use of removable storage media, I/O Controller 115 may further support one or more ports, such as USB (universal serial bus) port 121 and media drive 119, such as, compact disk Read/Write (CDRW)/digital video disk (DVD) drive.

DPS 100 further comprises network interface device (NID) 125 by which DPS 100 is able to connect to and communicate with an external device, such as a client, via a network, such as the Internet. NID 125 may be a modem or network adapter and may also be a wireless transceiver device. DPS 100 comprises software and firmware mechanisms for enabling network connection and communication via NID 125.

Those of ordinary skill in the art will appreciate that the hardware depicted in FIG. 1 may vary. For example, other peripheral devices, such as optical disk drives and the like, also may be used in addition to or in place of the hardware depicted. Thus, the depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Various features of the invention are provided as software code stored within memory 106 or other storage 104 and executed by processor(s) 101. Thus, as shown by FIG. 1, in addition to the above described hardware components, DPS 100 further comprises a number of software components, including operating system (OS) 108 (e.g., Microsoft Windows®, a trademark of Microsoft Corp, or GNU®/Linux®, registered trademarks of the Free Software Foundation and The Linux Mark Institute) and one or more software applications and/or utilities. Among the software applications and utilities are (a) collaborative application software instructions, APP 112, which includes (b) software instructions for providing the application's client-server functionality, server and session code/data 114, and more specific to the invention, (c) software instructions for enabling the ideal server determination features described below. For simplicity, the collective body of code that enables the ideal server determination features is referred to herein as the Ideal Server utility 110. In actual implementation, the Ideal Server utility 110 is a subroutine within the collaborative application (APP 112) that executes on DPS 100 when DPS 100 is established as a client-server, which is executing the collaborative software application. In an alternative embodiment, the Ideal Server utility 110 may be a stand alone software application installed on one or more clients within a client-server network environment.

The collaborative application allows users in a client-server network to participate in an ongoing session. Thus, new users/participants may enter the session at various times during the session. In addition, the application has the capability (via Ideal Server utility 110) to permit a client-server and a client to switch relationships during active application execution. The application software may be, for example, an online game or an online chat-room. Each client system that participates in the application session is permitted as a participant following the loading of some basic software (which enables execution of the application) on the respective client system. The client-server has server and session data and executes processes to enable the sessions on compatible client systems (with basic application software).

During operation, OS 108, APP 112, and Ideal Server utility 110 are located within memory 106 and executed on processor (CPU) 101. According to the illustrative embodiment, APP 112 provides server and session code/data 114 when DPS 100 operates as the client-server. Further, when processor 101 executes Ideal Server utility 110, Ideal Server utility 110 enables DPS 100 to complete a series of functional processes, including: (1) evaluating the capabilities of DPS 100 and a new client computer system connected to DPS 100 over a client-server network; (2) determining whether the new client system has superior operational capabilities (processing power and network bandwidth, etc.) than DPS 100 to control the execution of APP 112; (3) transferring server and session code/data 114 for APP 112 from DPS 100 to the new client system when the new client system is determined to have superior operational capabilities; and other features/functionality described below and illustrated by FIGS. 2-5.

Figure 2:
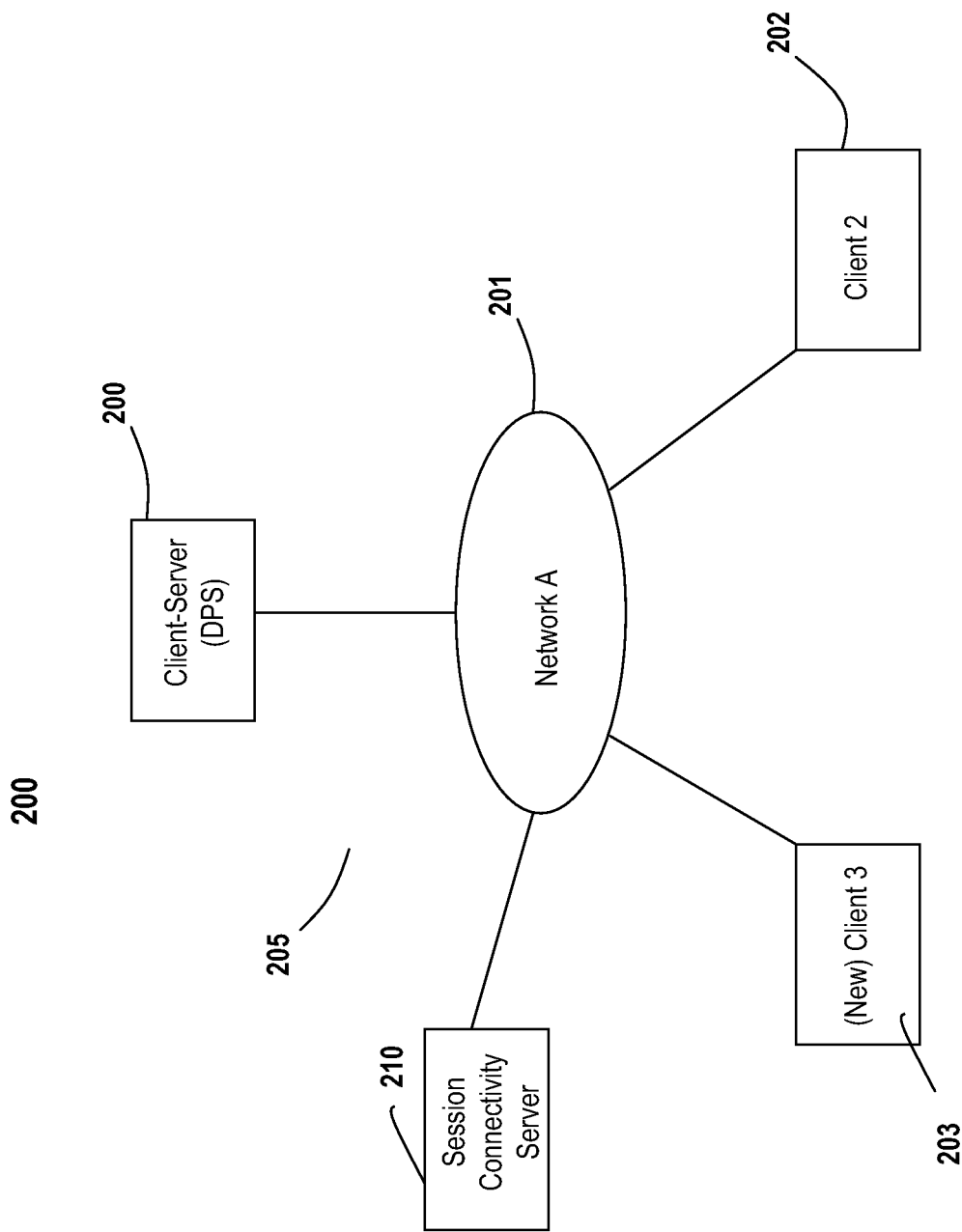
FIG. 2 illustrates a basic client-server network, according to an illustrative embodiment of the present invention.

FIG. 2 illustrates a client-server network, according to an illustrative embodiment of the present invention. Client-Server Network 205 comprises client-server 200 (assumed to be DPS 100), which is connected to client 2 202 and "new" client 3 203, both via Network 201. Client 2 202 and client 3 203 may both be computer systems that are similarly configured to DPS 100, but with different operational characteristics/parameters (e.g., processing power and/or speed and network connectivity bandwidth) than client-server 100. New client 3 203 represents a recently connected client within the collaborative application environment.

Network 205 may be, for example, a wide area network (WAN) such as the Internet, or a local area network (LAN), such as an Ethernet network. In Network 205, client-server 200 provides the collaborative application to the other clients (202, 203). Ideal Server utility 110 executes within client-server 200 and enables determination of whether a new client (for example, client 3 203) entering an ongoing client-server collaborative software application session has a higher computer "system value" (described in FIG. 3) than the current client-server's system value. In the description below, client-server 200 is referred to as the "current" client-server system to differentiate client-server 200 from a "candidate" client-server system, such as new client 3 203.

In a client-server collaborative software application environment, a client initiating an application is given (perhaps by the client-accessible application website) the role of a server and is referred to as a client-server. Any subsequent client requests received by the website for clients to participate in the application are directed to the client-server. As long as the number of participants does not exceed a certain value, the website continues to redirect session requests to the client-server. The website and/or client-server initiates a download of basic application software to allow a requesting client to participate in the application session. Once the basic software has been uploaded by the requesting client, the requesting client is permitted to enter the session. According to the described embodiment, clients in the client-server collaborative application session may take over the role of the client-server if at the time of a new client's entry into the application's ongoing session, the new client has better system capabilities (i.e., a better system value).

A client's system value is determined from operational parameters of the client. FIG. 3 illustrates an example tabulation of operational parameters for both client server 200 and new client 3 203. These system values are evaluated to determine which of the two systems has superior capabilities for executing the role/functions of a client-server for the particular collaborative application that is currently being executed on client-server 200. When the new client's system value is higher than the client-server's system value, the new client system is assigned the role of client-server following a transfer (of server and session code, data and processing). The transfer may require an approval by one or both of the current client-server and the new client (the candidate client-server). Once the transfer is completed, the new client, now the new client-server system, resumes server-level processing of the collaborative application and enables other clients to connect to the ongoing application session.

The tables of FIG. 3 contain system value parameters utilized by Ideal Server utility 110 to determine a relative system value, according to the illustrative embodiment of the present invention. Tables 300 comprise current client-server table 301 and new client table 302. Each table includes a plurality of parameters of which the following parameters are provided for illustration: (1) memory size; (2) storage capacity; (3) CPU speed; (4) network connection type; (5) network connection speed; and (6) affiliation. A determination of system value may factor one or more of the above system value parameters. For example, in determining network connectivity value, if a client connects to the network via a dialup modem, the client is assigned a low network value compared to a client that connects via a T1 or T3 line. As provided within tables 300, several of the parameters of the new client table 302 have better values than similar parameters in client-server table 301. Client-server's relative system value is a 7, while the system value of the new client is an 8.5. Thus, since the new client has a better/higher relative system value than the client-server, the new client would be selected as the new client-server.

The affiliation entry of tables 301 and 302 refer to pre-established groupings of "safe" or "trusted" client systems that may be made the client-server within the collaborative application environment. Affiliation value indicates whether a client is a member of a trusted network of friends of the current client-server. The clients may be uniquely identified by their system's IP (Internet Protocol) addresses or the user's login, or some other form of identification. The client-server maintains a list of these trusted client systems. For the client-server that originally initiated the application, the affiliation value is unnecessary or may be alternatively valued at the highest level. However, the original client-server (as well as subsequent client-servers) may provide a list of trusted friends to enable subsequent determination of whether a candidate client-server is a trusted affiliate or friend.

In one embodiment, the Ideal Server utility 114 on the client server restricts a transfer of server code/data to a new client that is not identified within the list of trusted client systems. As shown by FIG. 3, both tables indicate that the client-server (e.g., client-server 200 of FIG. 2) and the new client (e.g., new client 3 203 of FIG. 2) are in the same trusted network by having an affiliation value of "1". Thus, the transfer of client-server functionality to the new client with a higher system value may be completed. In yet another embodiment, when the new client is not within the network of trusted client systems, the client-server may receive a prompt indicating the existence of the new client within the network. The user of the client-server may then determine whether to enable the transfer of client-server functionality to occur. Different affiliation levels thus indicate different transfer options, ranging from (a) complete immediate transfer without notification to (b) prevent/block any transfer.

Figure 4:
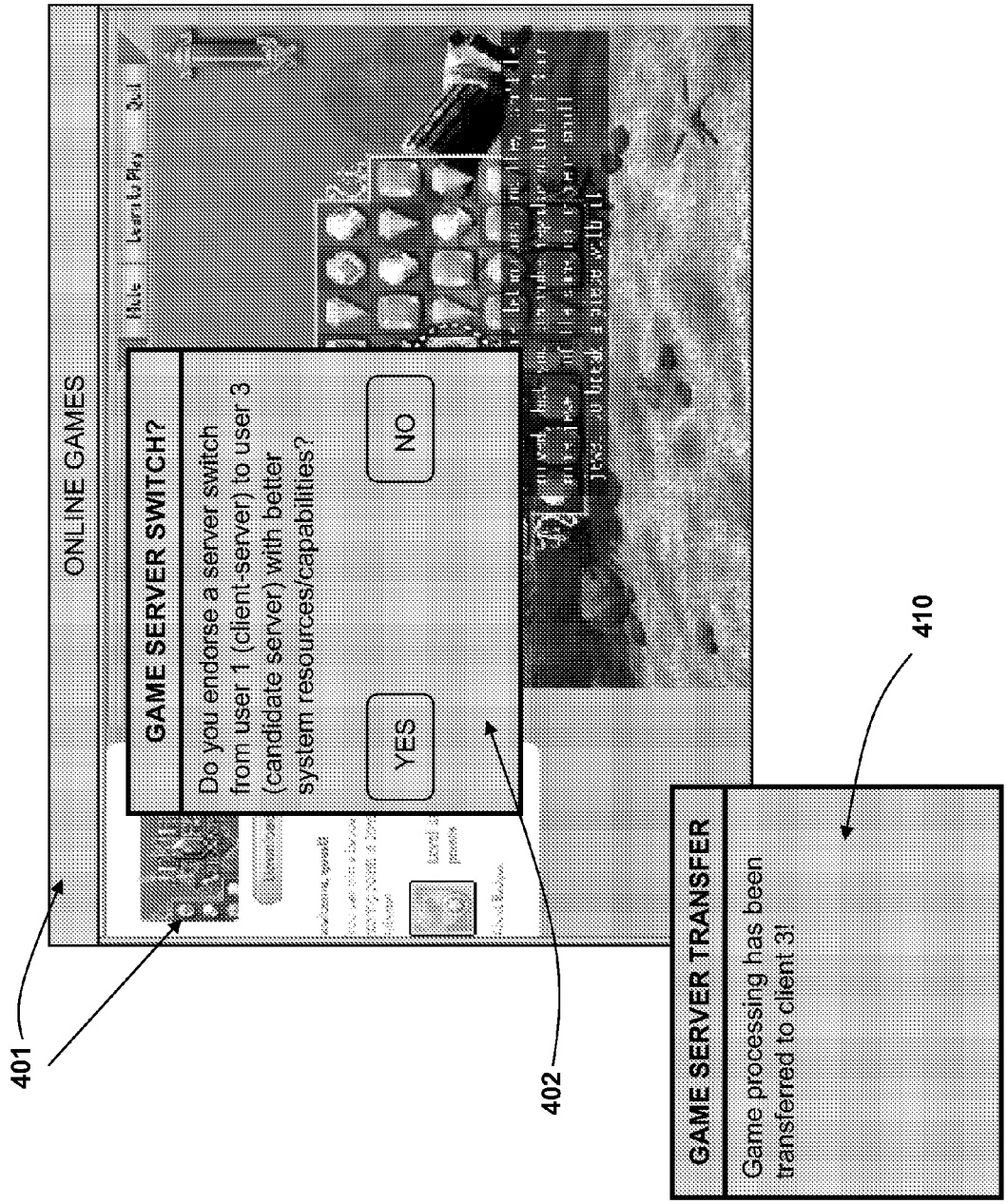
FIG. 4 illustrates an example online game with a selection (popup) window used in the process of approving a client-server switch, according to an illustrative embodiment of the present invention.

Turning now to FIG. 4, which illustrates a block diagram representation of the graphical user interface (GUI) for an online game application, which is the example collaborative application with which features of the invention may be advantageously applied. Display window 400 comprises game panel 401, which is an example of a GUI (graphical user interface) seen by participants in an online game application (session) running on client server 200 (FIG. 2).

Before Ideal Server utility 110 begins transfer of server and session code/data and application processing to a client system with a higher system value (i.e., superior operating capabilities), Ideal Server utility 110 initiates a process to determine whether a candidate client-server (for example, client 3 203 of FIG. 2) approves a transfer of application data and processing from the current client-server 200 to the candidate client-server (203). In the illustrative embodiment, selection window 402, which may be a popup window, is provided on the display of the candidate client-server. Once the selection window 402 is displayed, the candidate client-server is prompted to indicate (by selecting the "YES" option within selection window 402) approval or endorsement of the client-server switch, before the transfer process is allowed to continue. In this embodiment, only the approval of the candidate client-server is required and only the candidate client-server receives the approval selection window 402. At some point during or after completion of the transfer, the original client-server may be notified of the transfer via second popup window 410, for example. Once, the transfer has been completed, the resources of the former client-server are released.

In one embodiment, the current client-server (for example, client-server 200 of FIG. 2) is also prompted to approve the transfer. Such approval may be required in situations where the new client is not a member of the trusted network of client systems or other situations that merit such approval. The location of selection window 402 within display window 400 may be in one of the corners or at the bottom of display window 400 to minimize the overlapping of application interfacing while the notifications of the transfer are displayed on the respective client devices. Users of the current client-server or the candidate client-server may thus continue to interact with the application session while deciding whether to allow the transfer.

Figure 5:
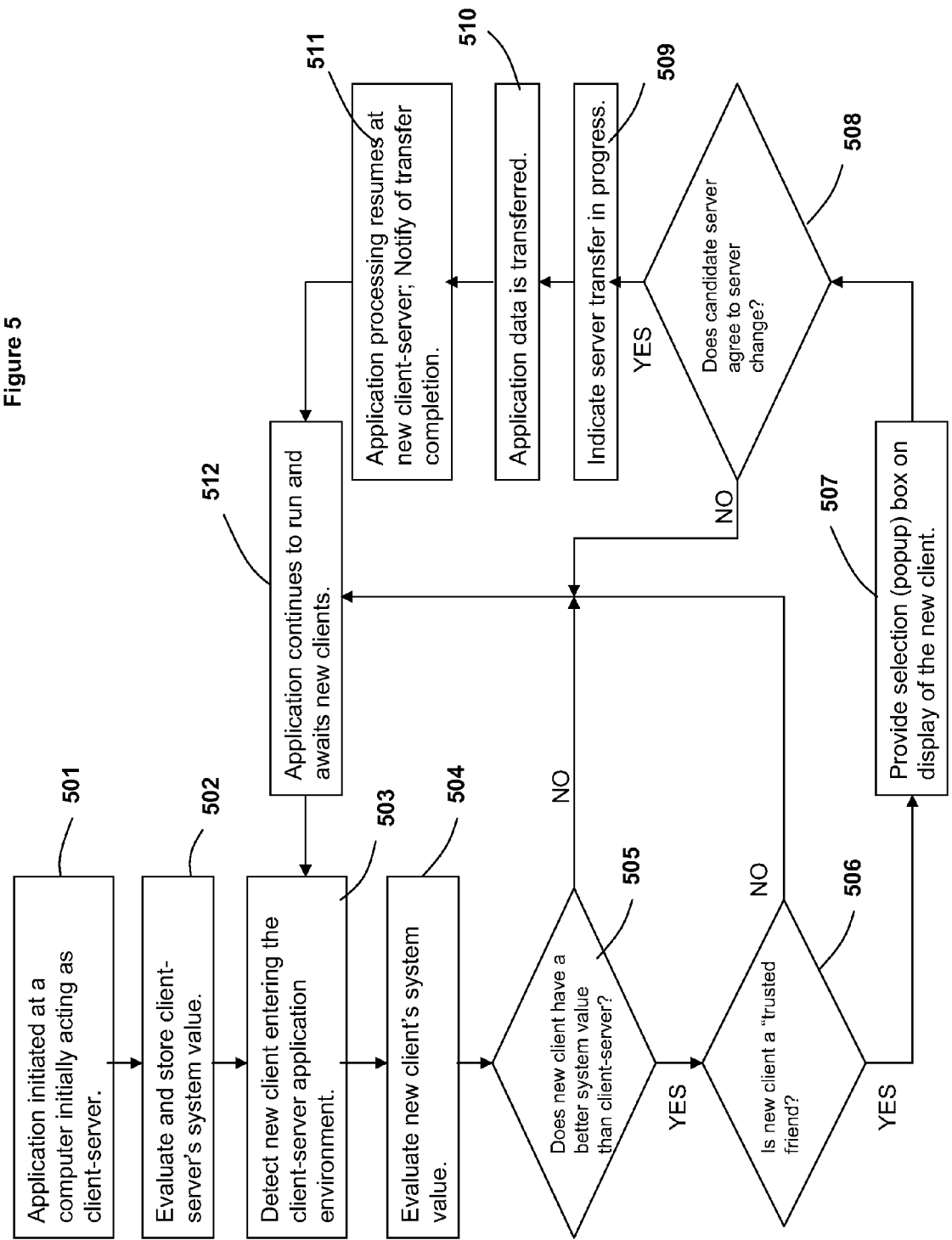
FIG. 5 is a flow chart which illustrates the process completed by an Ideal Server utility in evaluating and comparing computer systems and determining when to initiate a client-server switch, according to an illustrative embodiment of the present invention.

FIG. 5 illustrates the process completed by the Ideal Server utility in evaluating and comparing computer systems and determining when a client-server switch takes place, according to an illustrative embodiment of the present invention. The process begins at block 501, at which client-server collaborative application is initiated by a user whose computer initially acts as the client-server for the application. At block 502, Ideal Server utility evaluates the capabilities, calculates/determines the system value of the client-server and stores the client-server's system value.

The process continues at block 503, at which, ideal server utility 110 detects a client's entry into the ongoing session of the client-server application environment. As shown at block 504, the Ideal Server utility determines the new client's system value using similar parameters and assigning relative values as those utilized for determining the client-server's system value (at block 502 above). Using the client-server system value and the client system value, Ideal Server utility 110 then determines at block 505 whether the new client system has a higher system value (i.e., is a "better client-server system" for executing the application) than the current client-server. If, at block 505, the client value is not higher than the client-server value, then the process moves to block 512, at which the application continues execution on the current client-server and the Ideal Server utility continues to monitor for new clients in the ongoing application session.

However, when the new client's system value is higher than the client-server's system value, Ideal Server utility 110 determines whether the new client is a member of the client-server's trusted network of friends, as shown at block 506. If the client is a trusted friend of the client-server, then ideal server utility 110 provides a selection (popup) window, which appears on the display of the new client (candidate client-server), as shown at block 507. Accordingly, while Ideal Server utility 110 prepares to begin transfer of server and session data and application processing from the current client-server to the candidate client-server (with higher system value and which is a member of the trusted network of friends), Ideal Server utility 110 determines at block 508 whether the candidate client-server has approved the transfer. As provided above (FIG. 4), the candidate client-server may indicate approval of the transfer via the selection window. If, at block 508, the candidate client-server approves the transfer (by selecting "YES" within the selection window), a notification is provided (to one or more clients) to indicate that a server transfer is in progress, as shown at block 509. The server and session code and data and application processing are transferred to the candidate client-server, as shown at block 510. Transfer of the application processing is completed in the background without any noticeable suspension of operations, enabling the seamless transfer of application processing to the candidate client-server. Thus, users in the session experience minimal interruption, if any.

In an alternative embodiment, application processing is suspending during the transfer, until the transfer of the server and session code and data to the candidate client-server has been completed. Application processing is initiated at the candidate client-server, now the existing/current client-server, and one or more of the clients are notified of the completion of the transfer, as shown at block 511. Once the candidate client-server is established as the existing/current client-server, the Ideal Server utility within the client-server is initiated, and, as shown at block 512, the Ideal Server utility of the existing/current client-server commences monitoring for detection of new clients as the new clients connect to the ongoing application session.

In the flow chart (FIG. 5) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for comparing capabilities of a next client computer system with capabilities of one or more existing client-servers connected via a collaborative application environment, the computer implemented method comprising:

detecting entry of the next client computer system coupled to a same collaborative application environment as a current client-server;

in response to detecting entry of the next client computer system, a processor executing an ideal server utility for determining when the next client computer system has a higher system value than the current client-server of the collaborative application environment, wherein the ideal server utility autonomously performs the steps of:

retrieving one or more operational capabilities of the next client computer system;

assigning a relative weight to the one or more operational capabilities of the next client computer system; and calculating a system value for the next client computer system utilizing the one or more operational capabilities of the next client computer system, wherein the system value of the next client computer system is an evaluation of the one or more operating capabilities of the next client computer system for executing a role or function provided by the current client-server for the collaborative application environment;

comparing a system value of the current client-server with the system value of the next client computer system in order to determine if the next client computer system has superior capabilities;

determining when the system value of the next client computer system is higher than the client-server system value of the current client-server; and in response to determining that the system value of the next client computer system is higher than the system value of the current client-server:

determining whether the next client computer system is a member of a trusted network of client computer systems, wherein determining whether the next client computer system is a member of the trusted network of client computer systems further comprises comparing an affiliation value of the next client computer system with a pre-established scale of affiliation values, including a first value which triggers the transferring, wherein the first value indicates a trust level of the next client computer system to the client-server; and in response to determining that the next client computer system is a member of the trusted network of client computer systems, transferring server and session data and application processing from the current client-server to the next client computer system.

2. The method of claim 1, wherein the client-server system value is calculated for the client-server prior to detecting entry of the next client computer system, the method further comprising:

retrieving one or more operational capabilities of the current client-server;

assigning a relative weight to the one or more operational capabilities of the client-server; and calculating a client-server system value for the client-server utilizing the one or more operational capabilities of the client-server, wherein the client-server system value is an evaluation of operating capabilities of the client-server for executing a role or function for the collaborative application environment;

wherein the one or more operational capabilities include:
central processing unit (CPU) capabilities;
network connectivity parameters;
non-volatile memory capabilities;
volatile memory capabilities; and
a network affiliation.

3. The method of claim 1, further comprising:
in response to determining that the next client computer system is not a member of the trusted network of client computer systems, enabling a transfer of the server and session data and application processing from the current client-server to the next client computer system only in response to receiving an approval response from the current client-server for said transfer.

4. The method of claim 1, wherein determining whether the next client computer system is a member of the trusted network of client computer systems further comprises:

checking an identification (ID) of the next client computer system against a list of trusted clients maintained by the current client-server to determine if the next client computer system is a member of the trusted network of client computer systems.

5. The method of claim 3, wherein the enabling further comprises:

displaying a selection request popup window over a current graphical user interface of an ongoing application session that is being displayed on a display of the next client computer system, wherein the selection request popup window indicates that approval of the transfer is required before the transfer is allowed to continue, and wherein the selection request popup window includes at least: a YES option that when selected approves the selection request, and a NO option;

detecting a response to the selection request, wherein the response includes an approval or a non-approval; and in response to the response including an approval:
notifying the current client-server of approval of the transfer via a second popup window on a display of the current client-server; and initiating the transfer of server and session data and application processing from the current client-server to the next client computer system.

6. The method of claim 1, further comprising:
in response to determining the system value of the next client computer system is higher than the system value of the current client-server:

notifying at least the next client computer system of a pending transfer of client-server functionality of the collaborative application environment;

triggering a prompt on the next client computer system for approval to initiate the transfer of client-server functionality of the collaborative application environment to the next client computer system; and initiating the transfer to the next client computer system only when the approval is received from the next client computer system.

7. The method of claim 1, wherein the transferring further comprises:

suspending application processing on the current client-server following the transfer of the server and session data and application processing from the current client-server to the next client computer system; and concurrently activating local application processing at the next client computer system, whereby a seamless transfer of the application processing is provided with a minimal interruption to an ongoing application session.

8. A data processing system comprising:
a processor which executes a collaborative application;
a memory system coupled to the processor and which stores code and data of the collaborative application;
a network connection mechanism for coupling one or more client computer systems to the data processing system within a collaborative application environment;
an ideal server utility that executes in the data processing system to cause the data processing system to:

detect entry of the next client computer system coupled to a same collaborative application environment as a current client-server;

in response to detecting entry of the next client computer system:

autonomously retrieve one or more operational capabilities of the next client computer system;

assign a relative weight to the one or more operational capabilities of the next client computer system; and calculate a system value for the next client computer system utilizing the one or more operational capabilities of the next client computer system, wherein the system value of the next client computer system is an evaluation of the one or more operating capabilities of the next client computer system for executing a role or function provided by the current client-server for the collaborative application environment;

compare a system value of the current client-server with the system value of the next client computer system in order to determine if the next client computer system has superior capabilities;

determine when the system value of the next client computer system is higher than the client-server system value of the current client-server; and in response to determining that the system value of the next client computer system is higher than the system value of the current client-server:

determine whether the next client computer system is a member of a trusted network of client computer systems, wherein determining whether the next client computer system is a member of the trusted network of client computer systems further comprises comparing an affiliation value of the next client computer system with a pre-established scale of affiliation values, including a first value which triggers the transferring, wherein the first value indicates a trust level of the next client computer system to the client-server; and in response to determining that the next client computer system is a member of the trusted network of client computer systems, transfer server and session data and application processing from the current client-server to the next client computer system.

9. The data processing system of claim 8, wherein the client-server system value is calculated for the client-server prior to detecting entry of the next client computer system, the ideal server utility further causes the data processing system to:

retrieve one or more operational capabilities of the current client-server;

assign a relative weight to the one or more operational capabilities of the client-server; and calculate a client-server system value for the client-server utilizing the one or more operational capabilities of the current client-server, wherein the client-server system value is an evaluation of operating capabilities of the client-server for executing a role or function for the collaborative application environment;

wherein the one or more operational capabilities include:
central processing unit (CPU) capabilities;
network connectivity parameters;
non-volatile memory capabilities;
volatile memory capabilities; and
a network affiliation.

10. The data processing system of claim 8, wherein the ideal server utility further causes the data processing system to:

in response to determining the next client computer system is not a member of the of the trusted network of client computer systems, enable the transfer of the server and session data and application processing from the current client-server to the next client computer system only in response to receiving an approval response from the current client-server, wherein the enabling further includes the utility causing the data processing system to:

display a selection request popup window over a current graphical user interface of an ongoing application session that is being displayed on a display of the next client computer system, wherein the selection request popup window indicates that approval of the transfer is required before the transfer is allowed to continue, and wherein the selection request popup window includes at least: a YES option that when selected approves the selection request, and a NO option;

detect a response to the selection request, wherein the response includes an approval or a non-approval;

in response to the response including an approval:
notify the current client-server of approval of the transfer via a second popup window on a display of the current client-server; and initiate the transfer of server and session data and application processing from the current client-server to the next client computer system.

11. The data processing system of claim 10, wherein determining when the next client computer system has a higher system value than the current client-server further comprises:

checking an identification (ID) of the next client computer system against a list of trusted clients maintained by the current client-server to determine if the next client computer system is a member of the trusted network of client computer systems.

12. The data processing system of claim 8, wherein the ideal server utility further causes the data processing system to:

in response to determining that system value of the next client computer system is higher than the system value of the current client-server:

notify at least the next client computer system of a pending transfer of client-server functionality of the collaborative application;

trigger a prompt on the next client computer system for approval to initiate the transfer of client-server functionality of the collaborative application to the next client computer system; and initiate the transfer to the next client computer system only when the approval is received from the next client computer system.

13. The data processing system of claim 8, wherein the transferring further comprises the utility causing the data processing system to:

suspend application processing on the current client-server following the transfer of the server and session data and application processing from the current client-server to the next client computer system; and concurrently activate local application processing at the next client computer system, whereby a seamless transfer of the application processing is provided with a minimal interruption to an ongoing application session.

14. A computer program product comprising:
a non-transitory computer readable storage medium; and
program instructions on the computer readable medium, having a plurality of instructions embodied therein, the plurality of instructions, when processed by a processing device, allows a processing device to:

detect entry of the next client computer system coupled to a same collaborative application environment as a current client-server;

in response to detecting entry of the next client computer system, autonomously perform the following functions:

retrieve one or more operational capabilities of the next client computer system;

assign a relative weight to the one or more operational capabilities of the next client computer system; and calculate a system value for the next client computer system utilizing the one or more operational capabilities of the next client computer system, wherein the system value of the next client computer system is an evaluation of the one or more operating capabilities of the next client computer system for executing a role or function provided by the current client-server for the collaborative application environment;

compare a system value of the current client-server with the system value of the next client computer system in order to determine if the next client computer system has superior capabilities;

determine when the system value of the next computer system is higher than the client-server system value of the current client-server of the collaborative application environment; and in response to determining that the system value of the next client computer system is higher than the system value of the current client-server:

determine whether the next client computer system is a member of a trusted network of client computer systems, wherein determining whether the next client computer system is a member of the trusted network of client computer systems further comprises comparing an affiliation value of the next client computer system with a pre-established scale of affiliation values, including a first value which triggers the transferring, wherein the first value indicates a trust level of the next client computer system to the client-server; and in response to determining that the next client computer system is a member of the trusted network of client computer systems, transfer server and session data and application processing from the current client-server to the next client computer system.

15. The computer program product of claim 14, wherein the client-server system value is calculated for the client-server prior to detecting entry of the next client computer system, the plurality of instructions further enabling the processing device to:

retrieve one or more operational capabilities of the current client-server;

assign a relative weight to the one or more operational capabilities of the client-server; and calculate a client-server system value for the client-server utilizing the one or more operational capabilities of the client-server, wherein the client-server system value is an evaluation of operating capabilities of the client-server for executing a role or function for the collaborative application environment;

wherein the one or more operational capabilities include:
central processing unit (CPU) capabilities;
network connectivity parameters;
non-volatile memory capabilities;
volatile memory capabilities; and
a network affiliation.

16. The computer program product of claim 14, the plurality of instructions to determine whether the next client computer system is a member of the trusted network of client computer systems comprising instructions for allowing the processing device to:

check an identification (ID) of the next client computer system against a list of trusted clients maintained by the current client-server to determine if the next client computer system is a member of the trusted network of client computer systems; and in response to determining the next client computer system is not a member of the trusted network of client computer systems, enable a transfer of the server and session data and application processing from the current client-server to the next client computer system only in response to receiving an approval response from the current client-server for said transfer.

17. The computer program product of claim 16, the plurality of instructions for enabling a transfer only in response to receiving an approval response further comprising instructions for allowing the processing device to:

display a selection request popup window over a current graphical user interface of an ongoing application session that is being displayed on a display of the next client computer system, wherein the selection request popup window indicates that approval of the transfer is required before the transfer is allowed to continue, and wherein the selection request popup window includes at least: a YES option that when selected approves the selection request, and a NO option;

detect a response to the selection request, wherein the response includes an approval or a non-approval; and in response to the response including an approval:

notify the current client-server of approval of the transfer via a second popup window on a display of the current client-server; and initiate the transfer of server and session data and application processing from the current client-server to the next client computer system.

18. The computer program product of claim 14, the plurality of instructions further comprising instructions for allowing the processing device to:

in response to determining the system value of the next client computer system is higher than the system value of the current client-server:

notify at least the next client computer system of a pending transfer of client-server functionality of the collaborative application environment;

trigger a prompt on the next client computer system approval to initiate the transfer of client-server functionality of the collaborative application to the next client computer system; and initiate the transfer to the next client computer system only when the approval is received from the next client computer system.

19. The computer program product of claim 17, the plurality of instructions for initiating the transferring of server and session data and application processing from the current client-server to the next client computer system further comprising instructions for allowing the processing device to:

suspend application processing on the current client-server following the transfer of the server and session data and application processing from the current client-server to the next client computer system; and concurrently activate local application processing at the next client computer system, whereby a seamless transfer of the application processing is provided with a minimal interruption to an ongoing application session.

20. A data processing system comprising:

a processor which executes a collaborative application;

a memory system coupled to the processor and which stores code and data of the collaborative application;

a network connection mechanism for coupling one or more client computer systems to the data processing system within a collaborative application environment; and an ideal server utility that executes in the data processing system to cause the data processing system to:

retrieve one or more operational capabilities of a current client-server;

assign a relative weight to the one or more operational capabilities of the current client-server, wherein the one or more operational capabilities include: central processing unit (CPU) capabilities, network connectivity parameters, non-volatile memory capabilities, volatile memory capabilities, and a network affiliation;

calculate a client-server system value for the current client-server utilizing the one or more operational capabilities of the current client-server, wherein the client-server system value is an evaluation of operating capabilities of the client-server for executing a role or function for the collaborative application environment;

detect entry of the next client computer system coupled to a same collaborative application environment as the current client-server;

in response to detecting entry of the next client computer system:
    autonomously retrieve one or more operational capabilities of the next client computer system;
    assign a relative weight to the one or more operational capabilities of the next client computer system; and
    calculate a system value for the next client computer system utilizing the one or more operational capabilities of the next client computer system, wherein the system value of the next client computer system is an evaluation of the one or more operating capabilities of the next client computer system for executing a role or function provided by the current client-server for the collaborative application environment;

compare a system value of the current client-server with the system value of the next client computer system in order to determine if the next client computer system has superior capabilities;

determine when the system value of the next client computer system is higher than the client-server system value of the current client-server;

in response to determining that the system value of the next client computer system is higher than the system value of the current client-server:
    determine whether the next client computer system is a member of a trusted network of client computer systems, wherein determining when the system value of the next client computer system is higher than the client-server system value of the current client-server further comprises:
        comparing an affiliation value of the next client computer system with a pre-established scale of affiliation values, including a first value which triggers the transferring, wherein the first value indicates a trust level of the next client computer system to the client-server; and
        checking an identification (ID) of the next client computer system against a list of trusted clients maintained by the current client-server to determine if the next client computer system is a member of the trusted network of client computer systems;

notify at least the next client computer system of a pending transfer of client-server functionality of the collaborative application;

in response to determining that the next client computer system is a member of the trusted network of client computer systems, transfer server and session data and application processing from the current client-server to the next client computer system, wherein the transferring further comprises the utility causing the data processing system to:
    suspend application processing on the current client-server following the transfer of the server and session data and application processing from the current client-server to the next client computer system; and
    concurrently activate local application processing at the next client computer system, whereby a seamless transfer of the application processing is provided with a minimal interruption to an ongoing application session;

trigger a prompt on the next client computer system for approval to initiate the transfer of client-server functionality of the collaborative application to the next client computer system;

initiate the transfer to the next client computer system only when the approval is received from the next client computer system; and in response to determining the next client computer system is not a member of the of the trusted network of client computer systems, enable the transfer of the server and session data and application processing from the current client-server to the next client computer system only in response to receiving an approval response from the current client-server, wherein the enabling further includes the utility causing the data processing system to:
    displaying a selection request popup window over a current graphical user interface of an ongoing application session that is being displayed on a display of the next client computer system, wherein the selection request popup window indicates that approval of the transfer is required before the transfer is allowed to continue, and wherein the selection request popup window includes at least: a YES option that when selected approves the selection request, and a NO option;
    detect a response to the selection request, wherein the response includes an approval or a non-approval; and
    in response to the response including an approval:
        notify the current client-server of approval of the transfer via a second popup window on a display of the current client-server; and
        initiate the transfer of server and session data and application processing from the current client-server to the next client computer system.

* * * * *